May 24, 1966  B. I. BELASCO  3,252,803
TREATMENT OF SOLID SUBSTANCES AND SURFACES
FOR SECURING SAID SUBSTANCES THERETO
Filed Feb. 1, 1963

INVENTOR.
BERNARD BELASCO
BY
Felshin and Rosen
ATTORNEYS

United States Patent Office 3,252,803
Patented May 24, 1966

3,252,803
TREATMENT OF SOLID SUBSTANCES AND SURFACES FOR SECURING SAID SUBSTANCES THERETO
Bernard I. Belasco, R.D. 4, Box 24, Newton, N.J.
Filed Feb. 1, 1963, Ser. No. 255,582
2 Claims. (Cl. 99—78)

This invention relates to the treatment of solid edible substances which are in powder or granular form and are soluble in a liquid, and to the treatment of surfaces so that the treated substance can be secured to the treated surface in the form of a coating thereon.

An object of the present invention is to provide a method of treating dry edible substances of the soluble type, which are in granular or powder form or otherwise in the form of a multiplicity of relatively small solid particles, so that the substance can be adhesively secured to a surface in a manner which permits the surface and the substance thereon to remain in such condition for relatively long periods of time, and wherein the adhered substance can be dissolved by a suitable liquid.

Another object is to provide a method of treating surfaces to permit treated solid edible substances to be secured thereto in the form of a soluble coating.

A further object is to provide an article of manufacture which has a surface to which is adhesively secured a coating of a dry powder or granular edible substance that is soluble in a liquid, and to provide a method of forming said article of manufacture.

The above and other objects, features and advantages of this invention will be more fully understood from the following description of the invention considered in connection with the accompanying illustrative drawings.

Figure 1:
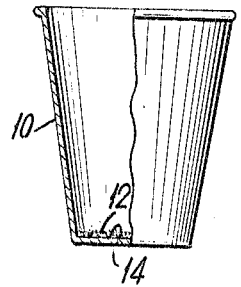
Figure 2:
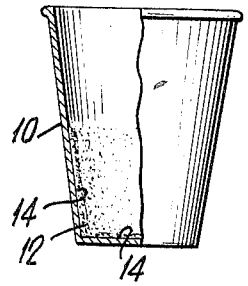
Figure 3:
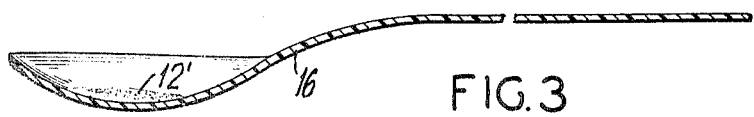
Figure 4:
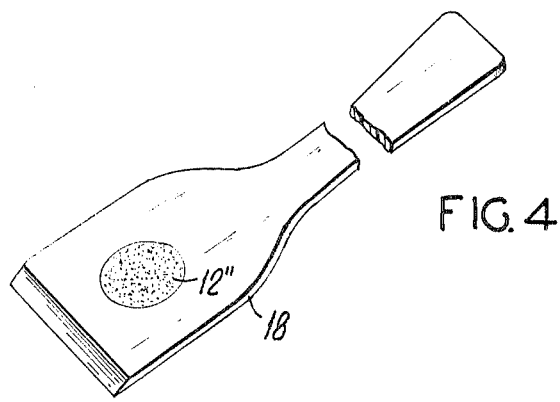

In the drawings:
FIG. 1 is a vertical view, partly in section, of a cup in accordance with the present invention;
FIG. 2 is a vertical view, similar to FIG. 1, and showing another form of the invention;
FIG. 3 is a longitudinal sectional view of a spoon in accordance with the present invention; and
FIG. 4 is a perspective view of a spatula in accordance with the present invention.

In accordance with the invention, the substances which are to be secured to a surface are solid dry edible materials which are in powder or granular form, or otherwise in the form of a multiplicity of relatively small solid particles which are soluble in a liquid. The substance may be an instant food, for example, powdered potatoes or instant soup; or an instant beverage, for example, instant coffee, instant milk, instant tea, cocoa, powdered chocolate, or instant fruit drinks (both carbonated and uncarbonated); or the substance may be a drug or medicine in dry powdered form; for example, aspirin, mouth wash, or antiacids.

The surfaces to which the edible substances are applied for securing thereto may be made of paper, which may be coated with wax or plastic material, or may be uncoated. The surfaces also can be made of plastic materials, or metal, including metal foil, or other non-metallic substances as glass, porcelain or wood. The surfaces can be in various forms, for example, disposable cups and containers, pans, stirrers, spatulas, flat sheets, etc., all of which are readily transportable and disposable. Moreover, the surfaces are such as to provide a convenient and economical means by which the edible substances can be packaged and sold to the consuming public.

For example, as illustrated by FIG. 1, a disposable paper cup 10 is shown with a coating 12 of a dry edible powdered substance adhesively secured to the bottom surface 14 of the cup in accordance with the present invention. Such a cup is readily utilized in the well known dispensing machine for providing beverages or soups which are easily formed by the introduction of a suitable edible solvent into the cup, for example, hot water. The material can be applied to the sides as well as the bottom of the cup, as illustrated by FIG. 2. As a further example, FIG. 3 illustrates a disposable plastic spoon provided with a coating 12' of a dry edible powdered drug substance, for example, aspirin, which is readily dissolvable by the addition of water. In this manner the equivalent of one or two aspirin tablets can be readily distributed in the form illustrated and can be conveniently ingested by the person by merely adding water to dissolve the aspirin. FIG. 4 illustrates a spatula 18 provided with a coating 12" of the edible material secured to the surface of the spatula. It is to be observed that in addition to hot or cold water as the solvent for many of the dried substances, milk is also an important solvent which is conveniently used with many of the dried substances, as for example, soups. Other edible solvents can be used.

As indicated above, both the substance and the surface are treated in order to adhesively secure the substance to the surface. The powdered substance is treated by thoroughly mixing it with an oil which preferably is a constituent of the substance. For example, in the case of instant coffee, coffee bean oil was thoroughly intermixed with the instant coffee. In the case of instant orange and lemon flavored beverages, both carbonated and uncarbonated, lemon oil was intermixed with the dry powdered substance. While the oil of the substance is preferred, other edible oils can be used, especially with those substances which do not have a natural oil or where the oil is not available. For example, corn oil showed good adhesive qualities when intermixed with instant coffee, cocoa, orange and lemon drinks, although the resulting product was not as flavorable. Other edible oils can be used, as for example, eucalyptus oil, menthol oil, or essential oils.

The surface to which the intermixed substances and oil is applied is first treated by coating it with a thin layer of the same oil with which the substance is intermixed. The resulting intermixed material is then applied to the oil-covered surface in any suitable manner. The material can be applied directly to the treated surface by hand or it can be sprayed, brushed, printed, rolled on, or otherwise applied to the treated surface. The intermixed and oil-treated material forms a coating, as illustrated by the drawing, which is secured to the oil-treated surface on which it is applied with a high degree of adhesiveness. This permits the resulting coated surface to be easily fabricated, handled, shipped, and stored without separation of the edible coating from the surface.

The quantity of edible oil which is mixed with the edible substance should comprise 0.01% to and including 0.05% by weight of the substance. The quantity of the edible oil which is applied to the surface for coating the latter should comprise 0.05% to and including 0.1% by weight of the edible substance which is applied to the oil-treated surface.

While I have shown and described the preferred embodiment of my invention, it will be understood that the invention may be embodied otherwise than as herein specifically illustrated or described, and that certain changes in the form and arrangement of parts and in the specific manner of practicing the invention may be made without departing from the underlying ideas or principles of this invention within the scope of the appended claims.

I claim:
1. A method of securing an edible soluble substance in the form of a multiplicity of separate solid particles to a surface of a utensil which is to support said substance, said method comprising intermixing said particles with an amount of an edible oil consisting of from 0.01% to 0.05% by weight of said substance, coating said surface with an additional amount of said edible oil consisting of from 0.05% to 0.1% by weight of said substance, and applying said oil intermixed particles to said oil coated surface, whereby said oil intermixed particles will be adhesively secured to and will form a coating on said utensil.

2. A method according to claim 1, in which said edible oil is one of the oil constituents of said substance.

References Cited by the Examiner

UNITED STATES PATENTS

| | | |
|---|---|---|
| 1,124,611 | 1/1915 | Hamburg. |
| 2,062,897 | 12/1936 | Michel et al. |
| 2,926,091 | 2/1960 | Riddle _____ 99—140 |
| 2,949,365 | 8/1960 | Becker. |

A. LOUIS MONACELL, *Primary Examiner.*

M. W. GREENSTEIN, *Assistant Examiner.*